Figure 1:
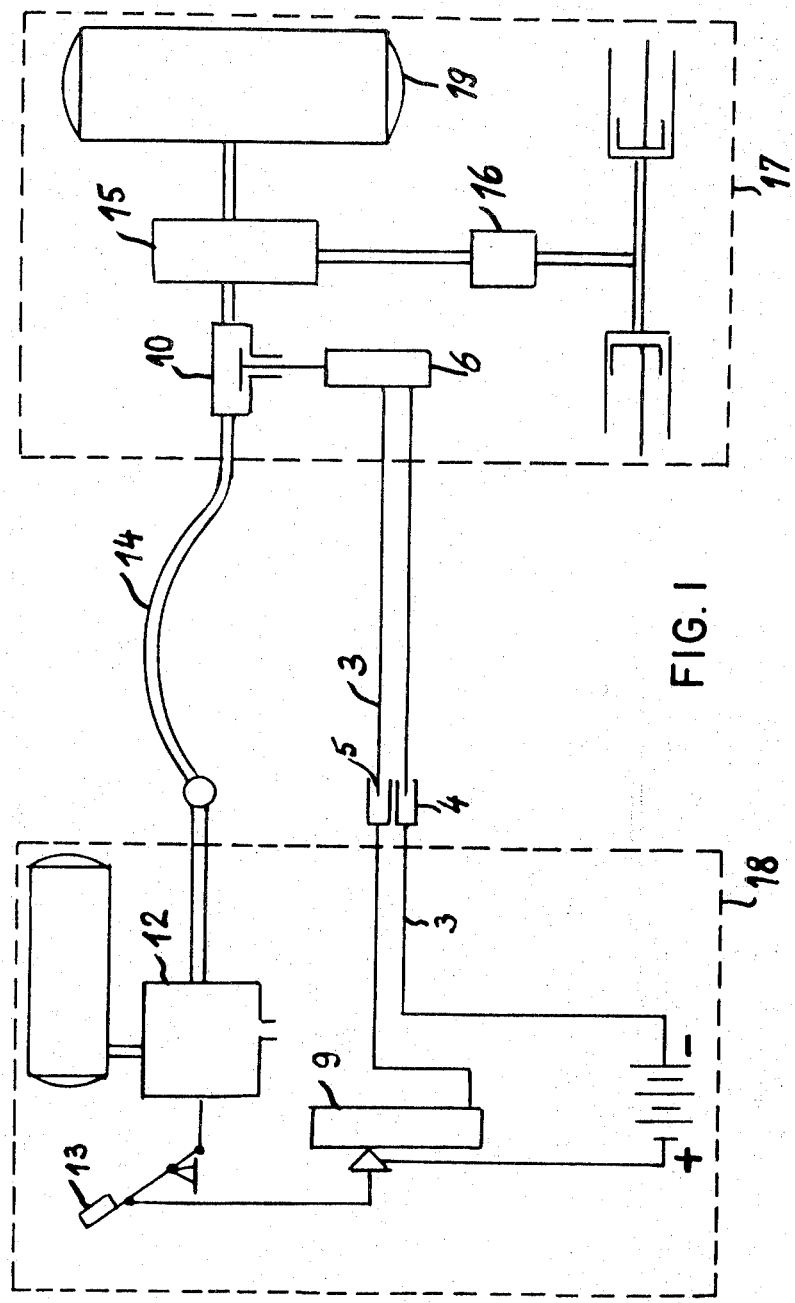

United States Patent
Cermak

[11] 3,819,238
[45] June 25, 1974

[54] BRAKE AND EMERGENCY BRAKE INSTALLATION FOR VEHICLE TRAILERS

[76] Inventor: Eduard Cermak, Hadynstr. 6, Heilbronn, Germany

[22] Filed: Dec. 6, 1972

[21] Appl. No.: 312,745

[52] U.S. Cl............................ 303/47, 303/7, 303/15, 303/63
[51] Int. Cl............................................. B60t 15/46
[58] Field of Search................ 303/47, 7, 8, 3, 2, 5, 303/13, 15, 16, 17, 28, 63, 40; 188/3, 112, 156

[56] References Cited
UNITED STATES PATENTS

| | | | |
|---|---|---|---|
| 3,482,885 | 12/1969 | Campanini | 303/7 |
| 3,507,542 | 4/1970 | Cannella | 303/7 |
| 3,708,212 | 1/1973 | Cannella | 303/7 |

*Primary Examiner*—Duane A. Reger
*Assistant Examiner*—D. C. Butler
*Attorney, Agent, or Firm*—Warren, Rubin, Brucker & Chickering

[57] ABSTRACT

Improvement in conventional pneumatic braking systems for lead and trailer vehicles wherein actuation of the trailer braking system is accelerated to overcome time lag between application of brake pedal or lever and the trailer brakes, a condition which may dangerously affect the relationship between lead vehicle and trailer, i.e., jack knifing, over extended braking distance. Accelerated actuation is achieved either by (1) an air vent valve located in the vicinity of the trailer brake valve assembly, and electrically actuated by depression of the brake pedal or lever, or (2) a straightway valve between the trailer brake auxiliary compressed air reservoir and brake cylinder assembly which may be actuated by a pressure switch and relay associated with the brake pedal assembly to instantaneously by-pass the brake valve assembly and cause initial braking which, upon sustained depression of the brake pedal, is followed by the normal brake system operation.

5 Claims, 3 Drawing Figures

BRAKE AND EMERGENCY BRAKE INSTALLATION FOR VEHICLE TRAILERS

This invention relates to fluid braking systems for all types of trailer vehicles, including truck trailers, railroad train cars, and the like; and more particularly to an electropneumatic brake installation for such trailer vehicles. Specifically, the invention generally assures proper tracking and continuous trailer or railroad car alignment during all conditions of braking, and may be adapted to existing pneumatic or pneumatic-hydraulic brake equipment.

Several prior art references with which I am familiar deal with the subject matter of pneumatic braking systems generally, although none appear to disclose or even suggest the solution to the problem of continuous vehicle alignment under all braking conditions which the present invention describes and claims —see for example the following West German Patents:

No. 1,555,308 for COMPRESSED AIR BRAKE INSTALLATION FOR VEHICLES;

No. 1,192,066 for ELECTRO-PNEUMATIC BRAKE CONTROL FOR MOTOR VEHICLES/TRAINS to Knorr GmbH., Munchen;

No. 1,103,779 for CENTER PRESSURE BRAKE INSTALLATION ESPECIALLY FOR MOTOR VEHICLES to Daimler-Benz;

No. 841,408 for EMERGENCY BRAKE INSTALLATION to Fischer, Hamburg;

No. 813,111 for EMERGENCY BRAKE INSTALLATION FOR COMPRESSED AIR ACTUATED VEHICLES PARTICULARLY MOTOR VEHICLES: and No. 1,938,206 for QUICK RELEASE VALVE to Graudreinse GmbH., Heidelberg.

Under normal braking conditions, that is to say when vehicle and trailer brakes are gradually applied—sometimes called "soft" braking—the brakes of the hauled or trailing vehicles are applied first; and shortly thereafter the brakes of the lead car or truck motorized unit are applied. In this way continued, normal end-to-end alignment of lead vehicle and trailer is generally assured, and the tendency of the hauled vehicle to "jack knife," as explained below, is minimized, if it occurs at all.

However, if the pneumatic brakes of the conventional fluid braking system are applied suddenly, as in emergency braking, then in both so-called single-line and dual-line systems, the trailer vehicle brakes invariably act an instant or more later than those of the forward unit, the hauling vehicle or railroad engine car. In such case, the trailer vehicle tends to push or overtake the lead vehicle; and because of this the trailer may swing out around the lead car, a condition sometimes referred to as "jack knifing." When this happens, damage may occur to the coupling between the vehicles, one or both may be overturned, and very often serious accidents with other vehicles, persons, or property result. This problem has long plagued the transportation industry.

The reason that the above described problem occurs under sudden or emergency braking of pneumatic brake systems is due to the time lag which occurs after application of the brake pedal or lever and venting of the brake system's main compressed air line. Venting the air line causes actuation of the brake's auxiliary air reservoir and air cylinder, all in a manner familiar to those having ordinary skill in the art to which this invention pertains. Late venting of the trailer vehicle's brake system, i.e., after the brakes of the forward vehicle have been or are about to be applied, is the primary problem to which my invention is directed.

The aforementioned time lag or response delay to trailer vehicle braking commonly encountered in pneumatic air brake systems also causes undesirably long braking distances, even when jack knifing does not occur.

Thus it is an object of the present invention to minimize, if not eliminate altogether, the time lag or response delay commonly encountered in conventional pneumatic braking systems between the moment of sudden application of the brake pedal or lever and actual brake engagement at the trailer vehicle's brake drums (or discs).

It is a feature and an advantage of my invention that such reduction, if not elimination, of time lag between brake pedal or lever application and brake shoe contact substantially reduces the distance through which a lead vehicle and its trailer travel before coming to a braking halt.

A further feature and advantage of my invention is that as a result of reduction of time lag is applying the pneumatic brakes to the trailer vehicle, jack knifing is reduced, if not eliminated altogether.

Still another feature and advantage of my invention is its adaptability to existing pneumatic and pneumatic-hydraulic braking systems with relative ease of installation and at a cost which is well within the economic feasibility of most existing brake installations.

Further objects, features, and advantages of my invention will become apparent to one of ordinary skill in the art upon a reading of the following specification and with reference to the accompanying drawings.

Figure 2:
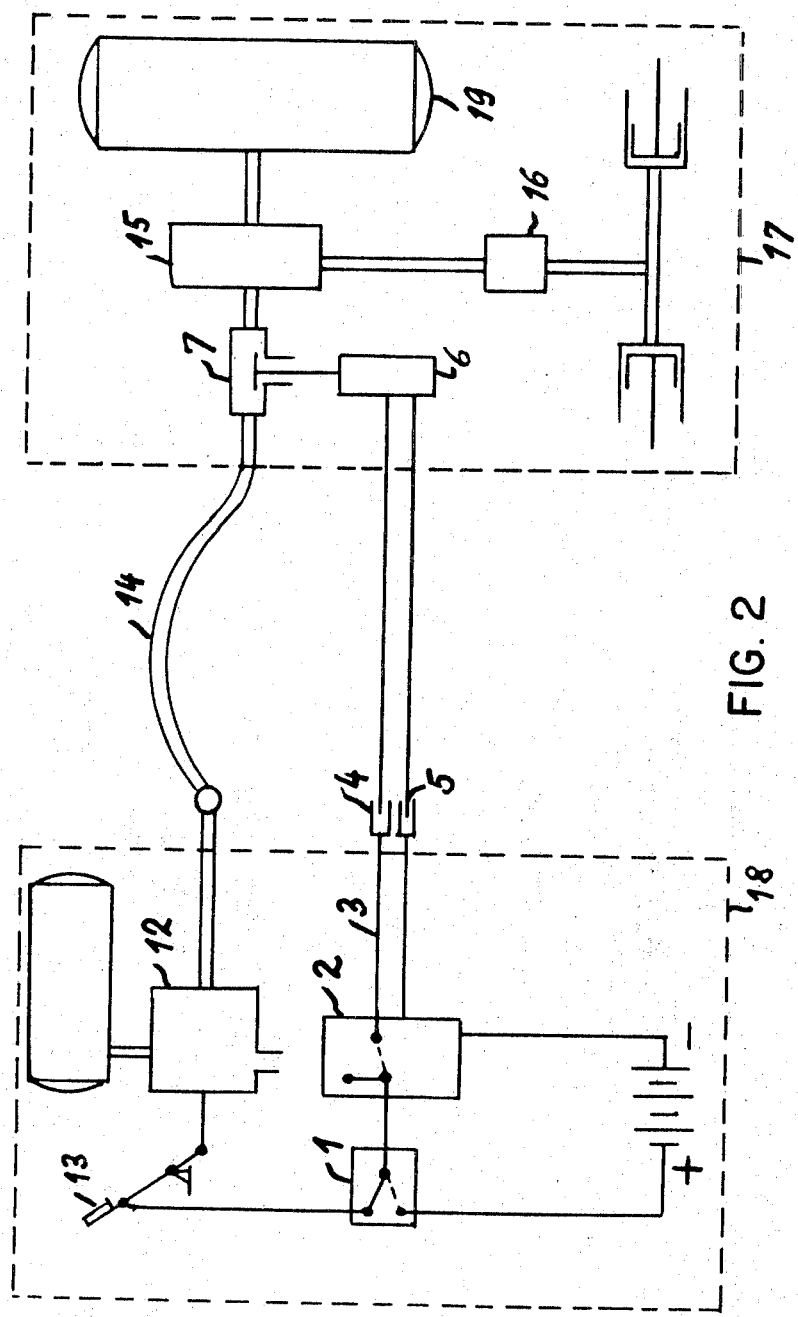
Figure 3:
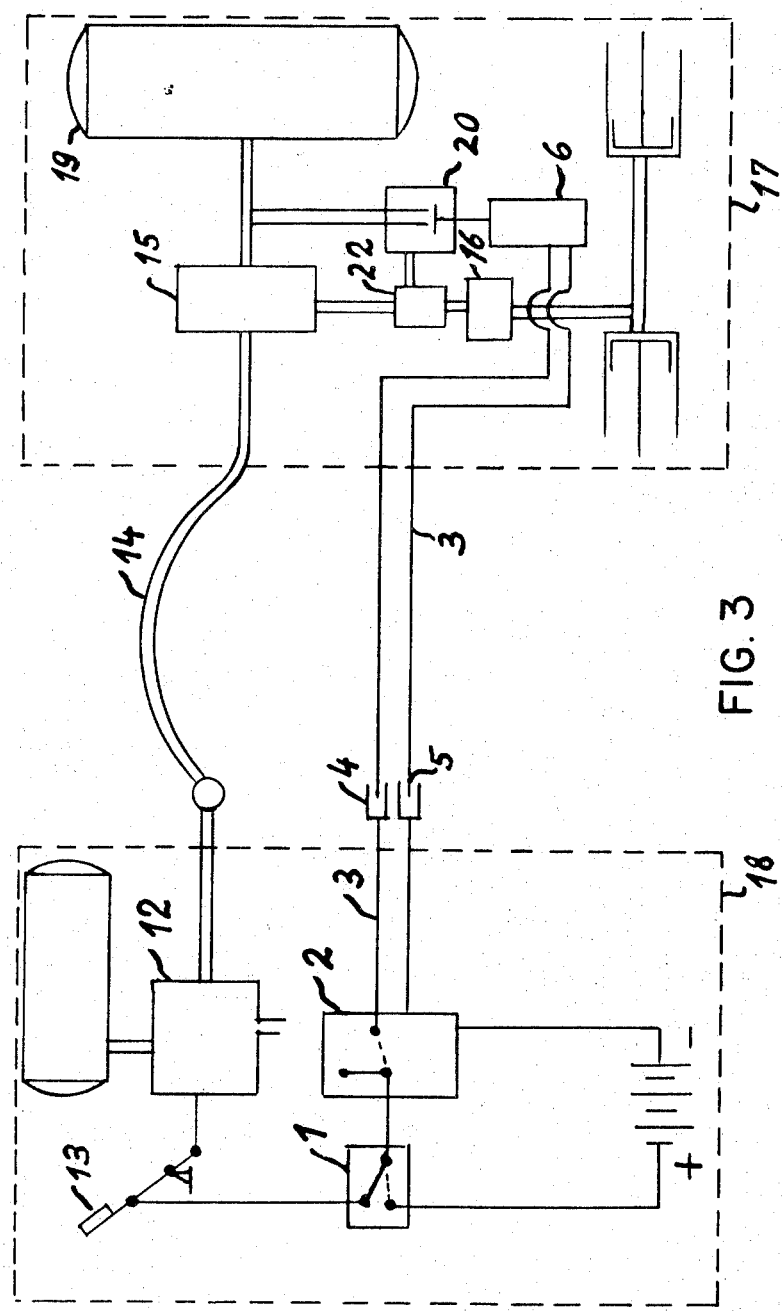

Turning now to the drawings,

FIG. 1 is a schematic diagram of a pneumatic brake system embracing my invention wherein the driving or lead vehicle components are designated within block 18 and the trailer section at block 17;

FIG. 2 discloses an alternative embodiment of my invention employing a modified brake pedal or lever assembly compared to that of the embodiment of FIG. 1; and FIG. 3 shows still another embodiment of my invention employing a further modified trailer brake system which provides an even more braking response in accordance with my invention.

The invention is best understood by turning first to FIG. 1 wherein I illustrate a typical pneumatic brake system augmented, however, to embody my invention. More particularly, FIG. 1 shows a control cab and lead vehicle unit prescribed by dashed line 18 interconnected to a trailer vehicle defined by dashed line 17. By actuation of brake pedal 13 located within the lead vehicle cab, adjustable resistance switch 9 may be energized by the electrical power source shown carried within control cab outline 18. Depending upon the setting of the adjustment for resistance switch 9, magnetic switch or solenoid 6 mounted at the trailer vehicle receive a predetermined voltage carried electrically thereto by means of conductive cables 3 conventionally interconnected by sockets 4 and plugs 5. In accordance with the level of voltage transmitted from the aforementioned power source through resistance switch 9 and conductors 3, solenoid 6 is caused to actuate spring loaded air vent valve 10 and thus achieve one of the main objects of the present invention, that is, elimination of the time lag between application of brake pedal 13 and prompt venting of air line 14, so as to actuate or shift trailer brake control valve 15 and cause air from tank 19 to be delivered immediately therethrough, and pressure regulator 16, to the dual brake cylinders shown.

This is achieved according to the present invention by providing air vent valve 10 in fluid communication with main air line 14 proximate trailer brake control valve 15 and auxiliary air reservoir tank 19. Thus when the brake pedal or lever 13 is actuated, not only is conventional trailer brake vent 12 eventually opened to the atmosphere, but by means of the pneumatic-electrical assembly just described, spring loaded air vent 10 is released immediately, and quick brake response achieved at the trailer vehicle brakes, even before the setting of the forward vehicle brakes which are equipped with only a pneumatically controlled system. In this manner, the trailer vehicle is always in braking condition before the lead vehicle, and thus never caused to push or overtake the lead cab under sudden or emergency braking, and jack knifing and excessive braking distances are minimized or avoided altogether.

In the foregoing paragraphs of my specification, explaining the embodiment of my invention as shown in FIG. 1, brake pedal or lever assembly 13 is coupled to a variable resistance switch 9, a conventional component known to those ordinarily skilled in the electrical arts. As indicated in the above referred to portion of the specification, actuation (in this case depression) of the brake means 13 varies the resistance switch until a predetermined level of voltage and current flowing from the power source indicated energizes solenoid 6 which in turn opens vent valve 10 so that compressor line 14 expels to the atmosphere even more rapidly than is caused to occur through release of trailer vent valve 12, located near brake pedal 13, located in the lead vehicle 18, and the main compressor tank also shown there.

At FIG. 2 of my drawing I show an alternate arrangement of my invention similar to that already described in respect to FIG. 1, except that variable resistance switch 9 is now replaced by electrical switch 1 and relay 2, whose operative details I now explain, omitting redundant explanations of the other components whose combination embrace my invention and have already been explained above with reference to FIG. 1. The alternative I now explain with reference to FIG. 2 is especially advantageous in conditions of emergency braking, as will hereinafter be apparent.

Electrical switch 1, mechanically coupled to brake assembly 13, controls flow of electrical current to relay 2, which may be located either in the forward vehicle or at the trailer. Switch 1 is of a type known in the electrical industry whose actuation may be adjusted to occur only upon the application of a predetermined pressure. This predetermined pressure may be arrived at experimentally, by trial and error; and in this manner I have found that satisfactory results are obtained when switch 1 is adjusted to actuate under maximum brake pressure of approximately 22 psi. Relay 2 is adjustable to allow flow of current therethrough for a predetermined period of time only, an adjustment which I have found gives satisfactory results when set for a period of approximately 1 second. In operation, therefore, when the operator suddenly applies brake 13 in an emergency, creating a maximum brake pressure of at least 22 psi, switch 1 actuates relay 2. The relay in turn actuates solenoid 6 for about one second and causes air vent valve 7 to expel the main air compressor line 14 to the atmosphere, thus providing immediate emergency braking.

If, after initial emergency braking, brake lever 13 is sustained in a braking position, and air vent valve 7 recloses because of the one-second time limit of relay 2, trailer brake valve 12 will continue to vent line 14; and the braking system will remain in operation.

On the other hand, if the emergency braking operation is discontinued immediately thereafter, and the brake pedal allowed to return to normal, air vent valve 7 closes because of the aforementioned limited time of operation of relay 2. Trailer brake valve 12 also returns to its normal non-venting condition and the air pressure in main compressor line 14 builds back up to normal almost immediately after the single emergency brake impulse condition ceases, thus rapidly placing the entire system in working order for subsequent braking action, if called for. In this manner such an alternative embodiment of my invention embraces significant advantages, particularly where frequent emergency stops followed by normal operation are commonly encountered.

A still further alternative embodiment of my invention, employing, however, the pressure sensitive switch 1 and limited time relay 2 explained above with reference to FIG. 2, is shown at FIG. 3. In this embodiment I utilize an initial trailer brake actuator assembly which by-passes brake valve 15, and in so doing I am able to achieve an even more rapid emergency or initial braking action, although a few additional components are required which causes the cost of this version of my invention to be somewhat more costly than the alternatives explained hereinabove with reference to FIGS. 1 and 2.

In the alternative version of FIG. 3 I introduce a so-called straight-way valve 20 in fluid communication between auxiliary or storage tank 19 and brake powder regulator 16 by means of by-pass lines 21. A double check valve 22 isolates straight-way valve 20 from regulator 16. Upon actuation of solenoid 6 by switch 1 and relay 2 as described above with reference to FIG. 2 (emergency braking with pedal or lever pressure of at least about 22 psi) straight-way valve 20 communicates compressed air from the reserve tank directly through lines 21, valve 20, and regulator 16 to the trailer vehicle brake cylinders. Check valve 22 acts in response to the compressed air flow to close off the lines from normal trailer brake control valve 15; and at the same time normal trailer air vent valve 12 operates to vent the main compressor line 14, thus actuating brake control valve 15. After the initial operation of the by-pass system (lines 21, straightway valve 20, check valve 22) for about one second, as determined by switch 1 and relay 2, valve 20 returns to its normally closed condition. Now, however, if brake 13 remains actuated, normal trailer vent valve 12 continues to purge main line 14; and brake actuation continues uninterrupted through brake control valve 15, it being appreciated that upon closing of valve 20, check valve 22 returns to its normal position closing off valve 20 and allowing air to pass from valve 15 to regulator 16 and thence to the brake cylinders. By this alternative assemblage of my invention, extraordinarily rapid initial braking of the trailer vehicle is achieved albeit involving some additional components and costs.

Application of any of the foregoing embodiments of my invention to multiple-trailer vehicle arrangements, such as railroad trains or trucks with more than one trailer van in tow, may now appear evident to one of ordinary skill in the art who has studied the foregoing specification and referenced accompanying drawings.

More specifically, a release valve is installed at each of the air vent cylinders of the rail cars, activated by a magnetic switch as explained more fully hereinabove. The flow of current for this switch is regulated from the locomotive car through an electrical line running through all cars. Thus the long air venting time for the whole train is minimized, if not avoided altogether, and the train receives a full braking effort in the shortest time possible.

The advantages attainable with this invention are multiple. Shorter braking distances in all cases and better directional stability. Easy installation into any existing brand of brake system, regardless of whether the equipment is a single- or dual-line system; moreover, it is possible to manufacture all of the embodiments of my invention from commercially available components. The economical expenditure compared to traffic safety gains is extremely low. In brake tests with a motor vehicle train equipped with the emergency brake system of my invention, brake distances were reduced by three meters based upon an initial velocity of approximately 25 MPH at the time braking commenced. It is emphasized that in an eventual malfunction of this invention, the fail-safe braking characteristics inherent before installation of the invention are not in any way altered.

I claim:

1. In a pneumatic brake system adapted for operation between a lead vehicle and a separate trailer vehicle coupled to the latter, said system of the type having a brake cylinder assembly carried by said trailer vehicle operable to set the brakes of said vehicle, a main compressor and a main compressor line in fluid communication therewith for delivering air at above atmospheric pressure to said trailer vehicle brake cylinder assembly, brake lever means carried by and operated from said lead vehicle to vent the main compressor line to the atmosphere, wherein said line when vented actuates said brake cylinder assembly to cause the trailer brakes to be applied, the combination comprising:

vent means carried by said trailer vehicle and actuable to provide fluid communication with said main compressor line and the atmosphere, said vent means proximate said trailer brake cylinder assembly;

electrical actuation means connected to said vent means and operable to cause the latter to vent said main compressor line to the atmosphere, said actuation means electrically connected to said brake means, last said means when applied to cause energization of said electrical actuation means, whereby said main compressor line is vented upon application of said brake lever means with a minimum of time lag between application of the brake lever and setting of the trailer vehicle brakes; and means connected to said vent means to restore the latter to a condition of non-venting of said main compressor line to the atmosphere upon release of said brake lever means, whereby normal non-braking air pressure is caused to be restored to the main compressor line promptly upon such release.

2. The pneumatic brake system in accordance with claim 1 and wherein said electrical actuation means comprises a variable resistance switch mechanically coupled to said brake means so that the resistance value thereof is varied as a function of the intensity of application of said brake means, and a solenoid mechanically coupled to said vent means and electrically connected to said variable resistance switch, said solenoid arranged to open said vent means when energized by a power source coupled thereto through said switch when the variable thereof reaches a predetermined value established by application of said brake means.

3. The pneumatic brake assembly in accordance with claim 1 and wherein further said electrical actuation means comprises an electrical switch assembly mechanically linked to said brake lever means, an electrical relay switch electrically connected to said switch assembly, and a solenoid mechanically coupled to said vent means and electrically connected to said relay switch, said solenoid arranged to open said vent means when energized by said relay, and wherein further said electrical switch assembly is provided with pressure sensitive means to cause said switch assembly to close only upon application of a predetermined brake pressure applied thereto, and said relay switch is provided with selectivity means to cause said relay to remain energized for a predetermined time period.

4. The pneumatic brake assembly in accordance with claim 3 and wherein further said predetermined brake pressure is approximately 22 psi and said predetermined time period is approximately one second.

5. In a pneumatic brake system adapted for operation between a lead vehicle and a separate trailer vehicle coupled to the latter, said system of the type having a brake cylinder assembly carried by said trailer vehicle operable to set the brakes of said vehicle, a brake valve assembly operable to cause air from a reservoir tank to be delivered therethrough to said brake cylinder assembly, an auxiliary reservoir tank proximate said brake cylinder assembly, a main compressor, and a main compressor line in fluid communication therewith for delivering air at above atmospheric pressure to said auxiliary reservoir tank for communication therefrom to said trailer vehicle brake cylinder assembly, brake lever means carried by and operated from said lead vehicle to vent the main compressor line to the atmosphere, wherein said line when vented actuates said brake cylinder assembly to cause the trailer brakes to be applied, the combination comprising:

by-pass valve means carried by said trailer vehicle and actuable to cause compressed air to be delivered from said auxiliary reservoir tank directly to said brake cylinder assembly to set the trailer brakes;

electrical actuation means mechanically coupled to said brake lever means for energization when the brake lever is engaged at a predetermined pressure, said electrical actuation means including means to actuate said by-pass valve and cause delivery of compressed air directly from said reservoir tank to said brake cylinder assembly for a predetermined period of time, and check valve means to isolate said brake valve assembly when said electrical actuation means causes said brake cylinder assembly to be actuated through said by-pass valve, and to isolate said by-pass valve and cause normal braking operation through said brake valve assembly after actuation of said brake lever means at said predetermined pressure.

* * * * *

UNITED STATES PATENT OFFICE
CERTIFICATE OF CORRECTION

Patent No.   3,819,238              Dated   June 25, 1974

Inventor(s)   Eduard Cermak

It is certified that error appears in the above-identified patent and that said Letters Patent are hereby corrected as shown below:

Column 2, line 48, after "more" insert ---rapid---;

Column 4, line 42, change "powder" to ---power---;

Column 5, Claim 1, line 59, after "brake" insert ---lever---;

Column 6, Claim 2, line 18, after "variable" insert ---resistance---.

Signed and Sealed this twenty-first Day of October 1975

[SEAL]

Attest:

RUTH C. MASON
*Attesting Officer*

C. MARSHALL DANN
*Commissioner of Patents and Trademarks*